United States Patent
Zhang

(10) Patent No.: US 11,044,722 B2
(45) Date of Patent: Jun. 22, 2021

(54) METHOD, APPARATUS, AND SYSTEM FOR CONFIGURING SYMBOL TRANSMIT TIMING

(71) Applicant: Huawei Technologies Co., Ltd., Guangdong (CN)

(72) Inventor: Chi Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/179,141

(22) Filed: Nov. 2, 2018

(65) Prior Publication Data
US 2019/0075565 A1    Mar. 7, 2019

Related U.S. Application Data

(63) Continuation of application No. PCT/CN2016/080904, filed on May 3, 2016.

(51) Int. Cl.
*H04W 72/04* (2009.01)
*H04W 56/00* (2009.01)
*H04W 72/08* (2009.01)
*H04W 88/08* (2009.01)

(52) U.S. Cl.
CPC ... *H04W 72/0446* (2013.01); *H04W 56/0045* (2013.01); *H04W 72/082* (2013.01); *H04W 88/08* (2013.01)

(58) Field of Classification Search
CPC ......... H04W 72/0446; H04W 56/0045; H04W 72/082; H04W 88/08
See application file for complete search history.

(56) References Cited

U.S. PATENT DOCUMENTS

| | | | |
|---|---|---|---|
| 8,335,176 B2 | 12/2012 | Ji et al. | |
| 2011/0080896 A1 | 4/2011 | Krishnamurthy et al. | |
| 2012/0269178 A1 | 10/2012 | Li et al. | |
| 2013/0016656 A1 | 1/2013 | Satou | |
| 2014/0050153 A1 | 2/2014 | Iwamura et al. | |
| 2015/0110209 A1 | 4/2015 | Zhou et al. | |
| 2015/0256429 A1 | 9/2015 | Yoshizawa et al. | |

FOREIGN PATENT DOCUMENTS

| | | |
|---|---|---|
| CN | 101123468 A | 2/2008 |
| CN | 101790188 A | 7/2010 |
| CN | 102647781 A | 8/2012 |
| CN | 103517398 A | 1/2014 |
| CN | 104854928 A | 8/2015 |
| EP | 2391159 A1 | 11/2011 |
| GB | 2489743 A | 10/2012 |
| KR | 101485780 B1 | 1/2015 |
| WO | 2013144681 A1 | 10/2013 |
| WO | 2015/013934 A1 | 2/2015 |
| WO | 2015137773 A1 | 9/2015 |

*Primary Examiner* — Jackie Zuniga Abad
(74) *Attorney, Agent, or Firm* — Leydig, Voit & Mayer, Ltd.

(57) ABSTRACT

Embodiments of the present application provide a signal communication method, including: a first base station determines a second timing for sending a first symbol to a terminal and a first timing for sending the first symbol to a second base station, where the first timing is at least determined by the second timing and a time offset between base stations; the first base station sends the first symbol to the second base station by using the first timing.

20 Claims, 8 Drawing Sheets

A base station 1 determines a second timing for sending a first symbol to a terminal — 601

The base station 1 determines a first timing for sending the first symbol to a base station 2, where the first timing is determined by at least the second timing and a time offset between base stations — 602

The base station sends the first symbol to the base station 2 by using the first timing — 603

METHOD, APPARATUS, AND SYSTEM FOR CONFIGURING SYMBOL TRANSMIT TIMING

CROSS-REFERENCE TO RELATED APPLICATIONS

This application is a continuation of International Application No. PCT/CN2016/080904, filed on May 3, 2016, the disclosure of which is hereby incorporated by reference in its entirety.

TECHNICAL FIELD

The present application relates to wireless communications technologies, and in particular, to a signal communication method, an apparatus, and a system.

BACKGROUND

Currently, transceiver entities pointed out in the wireless air interface technology include a base station and a terminal, and mainly relate to air interface communication between the base station and the terminal.

With continuous emergence of various new services and new technologies, communication between base stations and communication between terminals are gaining more attention.

However, in both the communication between base stations and the communication between terminals, there is a problem that a receiver of the communication cannot correctly receive a signal sent by a sender.

SUMMARY

The present application provides a signal communication method, so that in communication between base stations and communication between terminals, a receiver can correctly receive a signal of a sender.

According to an aspect, an embodiment of this application provides a signal communication method, including:

determining, by a first base station, a second timing for sending a first symbol to a terminal; determining, by the first base station, a first timing for sending the first symbol to a second base station, where the first timing is at least determined by the second timing and a time offset between base stations; and sending, by the first base station, the first symbol to the second base station by using the first timing.

The second base station may receive, by using a timing for receiving a first symbol sent by a communications device (including the terminal and another terminal) in the prior art, the first symbol sent by the first base station.

In the foregoing technical solution provided in this embodiment, the first base station sends the first symbol by using the first timing, and a transmit timing of the first symbol is adjusted, so that sending and receiving of the first symbol are aligned in time domain. Therefore, a signal added on the first symbol by the first base station can be completely and correctly received on the second base station, thereby improving quality of communication between the two.

In a possible design, the time offset between base stations is determined by a fixed timing advance offset $N_{TAoffset}$; or the time offset between base stations is determined by the $N_{TAoffset}$ and a distance between base stations. Whether the distance between base stations needs to be considered as a decisive factor for the time offset between base stations depends on a value of the distance between base stations. When an additional time offset caused by the distance between base stations cannot be ignored, the offset between base stations is determined by the $N_{TAoffset}$ and the distance between base stations.

In a possible design, the first timing is earlier than the second timing. In an implementation, the first timing is earlier than the second timing by a time duration $N_{TAoffset} \cdot T_s$. When a symbol is received and sent between base stations, if receive and transmit timings in the prior art are used, a start moment at which the first base station sends the first symbol is later than a start moment at which the second base station receives the first symbol. Therefore, when a timing at which the first base station sends the first symbol is earlier than a timing at which the first base station sends the first symbol to the terminal in the prior art by the time offset between base stations, the receiving and sending of the first symbol can be aligned in time domain, and when the additional time offset caused by the distance between base stations is not considered, a advanced time duration is $N_{TAoffset} \cdot T_s$.

In a possible design, a second symbol before the first symbol is not used for signal communication, and the second symbol and the first symbol are consecutive. In this way, it is avoided that, when the first symbol is sent by using the first timing, a signal on the first symbol conflicts with a signal that may be transmitted on the second symbol. That is, the second symbol may serve as a transmission guard interval. In an implementation, the first base station may fill the second symbol with all "0" bits or "1" bits in advance. In addition, this solution does not affect communication between the first base station and another device while maximizing network resource utilization.

In another possible design, a plurality of consecutive symbols before the first symbol are not used for signal communication, and the first symbol and the plurality of consecutive symbols are also consecutive.

In a possible design, a signal sent by the first base station to the second base station may be carried on a plurality of consecutive symbols.

According to another aspect, an embodiment of this application provides a signal communication method, including:

determining, by a first terminal, a fourth timing for sending a third symbol to a base station; determining, by the first terminal, a third timing for sending the third symbol to a second terminal, where the third timing is determined by at least the fourth timing and a time offset between terminals; and sending, by the first terminal, the third symbol to the second terminal by using the third timing.

The second terminal may receive, by using a timing for receiving a first symbol sent by a communications device (including the base station and another base station) in the prior art, the third symbol sent by the first terminal.

In the foregoing technical solution provided in this embodiment, the first terminal sends the third symbol by using the third timing, and a transmit timing of the third symbol is adjusted, so that sending and receiving of the third symbol are aligned in time domain. Therefore, a signal added on the third symbol by the first terminal can be completely and correctly received on the second terminal, thereby improving quality of communication between the two.

In a possible design, the time offset between terminals is determined by a fixed timing advance offset $N_{TAoffset}$; or the time offset between terminals is determined by the $N_{TAoffset}$ and a distance between terminals. Whether the distance between terminals needs to be considered as a decisive factor for the time offset between base stations depends on a value of the distance between terminals. When an additional time offset caused by the distance between terminals cannot be ignored, the offset between terminals is determined by the $N_{TAoffset}$ and the distance between terminals.

In a possible design, the third timing is later than the fourth timing. In an implementation, the third timing is later than the second timing by a time duration $N_{TAoffset} \cdot T_s$. When a symbol is received and sent between terminals, if receive and transmit timings in the prior art are used, a start moment at which the first terminal sends the third symbol is earlier than a start moment at which the second terminal receives the third symbol. Therefore, when a timing at which the first terminal sends the third symbol is later than the fourth timing at which the first terminal sends the third symbol to the base station in the prior art by the time offset between terminals, the receiving and sending of the third symbol can be aligned in time domain, and when the additional time offset caused by the distance between terminals is not considered, a lagged time duration is $N_{TAoffset} \cdot T_s$.

In a possible design, a fourth symbol after the third symbol is not used for signal communication, and the third symbol and the fourth symbol are consecutive. In this way, it is avoided that, when the third symbol is sent by using the third timing, a signal on the third symbol conflicts with a signal that may be transmitted on the fourth symbol. That is, the fourth symbol may serve as a transmission guard interval. In an implementation, the first terminal may fill the fourth symbol with all "0" bits or "1" bits in advance. In addition, this solution does not affect communication between the first terminal and another device while maximizing network resource utilization.

In another possible design, a plurality of consecutive symbols after the third symbol are not used for signal communication, and the third symbol and the plurality of consecutive symbols are also consecutive.

In a possible design, a third signal sent by the first terminal to the second terminal may be carried on a plurality of consecutive symbols.

According to another aspect, an embodiment of this application provides a signal communication method, including:

determining, by a second base station, an eighth timing for receiving a first symbol sent by a terminal; determining, by the second base station, a seventh timing for receiving the first symbol sent by a first base station, where the seventh timing is at least determined by the eighth timing and a time offset between base stations; and receiving, by the second base station by using the seventh timing, the first symbol sent by the first base station.

The first base station may send, by using a timing for sending a third symbol to a communications device (including the terminal and another terminal) in the prior art, the first symbol to the second base station.

In the foregoing technical solution provided in this embodiment, the second base station receives the first symbol by using the seventh timing, and a receive timing of the first symbol is adjusted, so that sending and receiving of the first symbol are aligned in time domain. Therefore, a signal added on the first symbol by the first base station can be completely and correctly received on the second base station, thereby improving quality of communication between the two.

In a possible design, the time offset between base stations is determined by a fixed timing advance offset $N_{TAoffset}$; or the time offset between base stations is determined by the $N_{TAoffset}$ and a distance between base stations. Whether the distance between base stations needs to be considered as a decisive factor for the time offset between base stations depends on a value of the distance between base stations. When an additional time offset caused by the distance between base stations cannot be ignored, the time offset between base stations is determined by the $N_{TAoffset}$ and the distance between base stations.

In a possible design, the seventh timing is later than the eighth timing. In an implementation, the seventh timing is later than the eighth timing by a time duration $N_{TAoffset} \cdot T_s$. When a symbol is received and sent between base stations, if receive and transmit timings in the prior art are used, a start moment at which the first base station sends a seventh symbol is later than a start moment at which the second base station receives the seventh symbol. Therefore, when a timing at which the second base station receives the first symbol is later than a timing at which the second base station receives the first symbol sent by the terminal in the prior art by the time offset between base stations, the receiving and sending of the first symbol can be aligned in time domain, and when the additional time offset caused by the distance between base stations is not considered, a lagged time duration is $N_{TAoffset} \cdot T_s$.

In a possible design, a seventh symbol after the first symbol is not used for signal communication, and the seventh symbol and the first symbol are consecutive. In this way, it is avoided that, when the first symbol is sent by using the seventh timing, a signal on the first symbol conflicts with a signal that may be transmitted on the seventh symbol. That is, the seventh symbol may serve as a transmission guard interval. In an implementation, the second base station may fill the seventh symbol with all "0" bits or "1" bits in advance. In addition, this solution does not affect communication between the first base station and another device while maximizing network resource utilization.

In another possible design, a plurality of consecutive symbols after the first symbol are not used for signal communication, and the first symbol and the plurality of consecutive symbols are also consecutive.

In a possible design, a signal sent by the first base station to the second base station may be carried on a plurality of consecutive symbols.

According to another aspect, an embodiment of this application provides a signal communication method, including:

determining, by a second terminal, a twelfth timing for receiving a third symbol sent by a base station; determining, by the second terminal, an eleventh timing for receiving the third symbol sent by a first terminal, where the eleventh timing is at least determined by the twelfth timing and a time offset between terminals; and receiving, by the second terminal by using the eleventh timing, the third symbol sent by the first terminal.

The first terminal may send, by using a timing for sending a first symbol to a communications device (including the base station and another base station) in the prior art, the third symbol to the second terminal.

In the foregoing technical solution provided in this embodiment, the second terminal receives the third symbol by using the eleventh timing, and a receive timing of the third symbol is adjusted, so that sending and receiving of the third symbol are aligned in time domain. Therefore, a signal added on the third symbol by the first terminal can be completely and correctly received on the second terminal, thereby improving quality of communication between the two.

In a possible design, the time offset between terminals is determined by a fixed timing advance offset $N_{TAoffset}$; or the time offset between terminals is determined by the $N_{TAoffset}$ and a distance between terminals. Whether the distance between terminals needs to be considered as a decisive factor for the time offset between base stations depends on a value of the distance between terminals. When an additional time offset caused by the distance between terminals cannot be ignored, the time offset between terminals is determined by the $N_{TAoffset}$ and the distance between terminals.

In a possible design, the eleventh timing is earlier than the twelfth timing. In an implementation, the eleventh timing is earlier than the twelfth timing by a time duration $N_{TAoffset} \cdot T_s$. When a symbol is received and sent between terminals, if receive and transmit timings in the prior art are used, a start moment at which the first terminal sends the third symbol is earlier than a start moment at which the second terminal receives the third symbol. Therefore, when a timing at which the second terminal receives the third symbol is earlier than the twelfth timing at which the second terminal receives the third symbol sent by the base station in the prior art by the time offset between terminals, the receiving and sending of the third symbol can be aligned in time domain, and when the additional time offset caused by the distance between terminals is not considered, a lagged time duration is $N_{TAoffset} \cdot T_s$.

In a possible design, a sixth symbol before the third symbol is not used for signal communication, and the third symbol and the sixth symbol are consecutive. In this way, it is avoided that, when the third symbol is sent by using the eleventh timing, a signal on the third symbol conflicts with a signal that may be transmitted on the sixth symbol. That is, the sixth symbol may serve as a transmission guard interval. In an implementation, the second terminal may fill the sixth symbol with all "0" bits or "1" bits in advance. In addition, this solution does not affect communication between the second terminal and another device while maximizing network resource utilization.

In another possible design, a plurality of consecutive symbols before the third symbol are not used for signal communication, and the third symbol and the plurality of consecutive symbols are also consecutive.

In a possible design, a signal sent by the first terminal to the second terminal may be carried on a plurality of consecutive symbols.

According to another aspect, an embodiment of the present application provides a terminal. The terminal has a function of implementing a behavior of the first terminal or the second terminal in the foregoing method designs. The function may be implemented by hardware, or may be implemented by hardware executing corresponding software. The hardware or software includes one or more modules corresponding to the foregoing function. The module may be software and/or hardware.

In a possible design, a structure of the terminal includes a transmitter, a receiver, and a processor. The processor is configured to: determine a fourth timing for sending a third symbol to a base station; and determine a third timing for sending the third symbol to a second terminal, where the third timing is at least determined by the fourth timing and a time offset between terminals; and the transmitter is configured to send the third symbol to the second terminal by using the third timing; or the processor is configured to: determine a twelfth timing for receiving a third symbol sent by a base station; and determine an eleventh timing for receiving the third symbol sent by the first terminal, where the eleventh timing is at least determined by the twelfth timing and a time offset between terminals; and the receiver is configured to receive, by using the eleventh timing, the third symbol sent by the first terminal.

According to another aspect, an embodiment of the present application provides a base station. The base station has a function of implementing a behavior of the first base station or the second base station in the foregoing methods. The function may be implemented by hardware, or may be implemented by hardware executing corresponding software. The hardware or software includes one or more modules corresponding to the foregoing function.

In a possible design, a structure of the base station includes a processor, a receiver, and a transmitter. The processor is configured to support the first base station or the second base station in performing a corresponding function in the foregoing methods. The transmitter and the receiver are configured to support communication between base stations. The transmitter sends information or an instruction used in the foregoing methods to another base station, and the receiver receives information or an instruction that is used in the foregoing methods and that is sent by another base station. The base station may further include a memory. The memory is configured to couple to the processor, and store a necessary program instruction and necessary data of the base station.

According to still another aspect, an embodiment of the present application provides a communications system. The system includes the first base station and the second base station in the foregoing aspects; or the system includes the first terminal and the second terminal in the foregoing aspects.

According to yet another aspect, an embodiment of the present application provides a computer storage medium, configured to store a computer software instruction used by the first base station or the second base station, where the computer storage medium includes a program designed to perform the foregoing aspects.

According to yet another aspect, an embodiment of the present application provides a computer storage medium, configured to store a computer software instruction used by the first terminal or the second terminal, where the computer storage medium includes a program designed to perform the foregoing aspects.

The technical solutions provided in the embodiments of the present application change a transmit timing or a receive timing of a symbol on which a transmitted signal is carried, so that a signal transmitted between base stations or between terminals can be completely and correctly received, and compared with the prior art, the present application prevents a problem of a communication failure caused by time domain misplacement of the transmitted signal.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DESCRIPTION OF EMBODIMENTS

A terminal accesses a core network (CN) by using a radio access network (RAN). A technology described in the present application may be applicable to a Long Term Evolution (LTE) system, or another wireless communications system that uses various radio access technologies, for example, a system that uses an access technology such as Code Division Multiple Access, Frequency Division Multiple Access, Time Division Multiple Access, Orthogonal Frequency Division Multiple Access, or Single Carrier Frequency Division Multiple Access. In addition, the technology may alternatively be applicable to a subsequent evolved system that uses the LTE system, for example, a 5th generation (5G) system.

Figure 1:
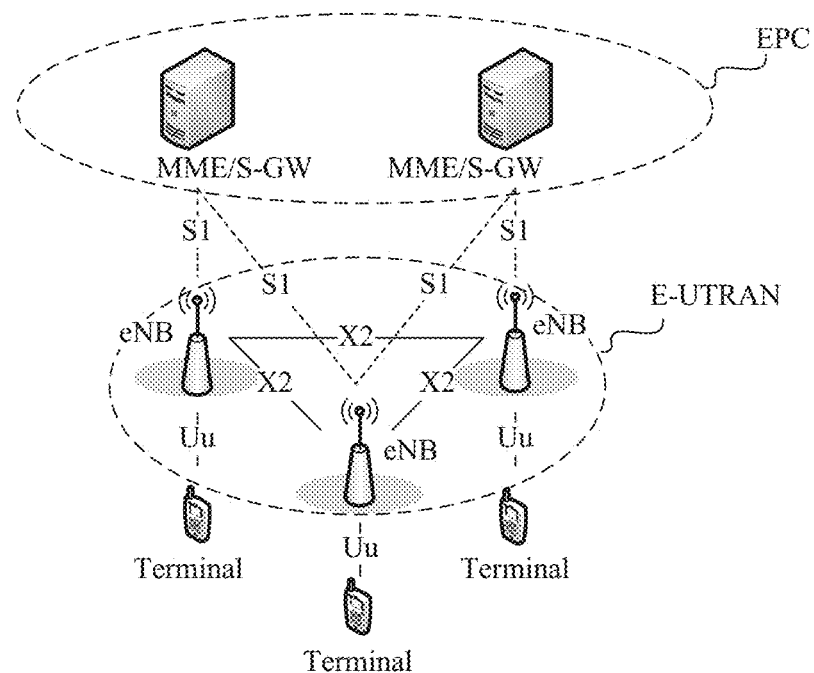
FIG. 1 is a system architectural diagram according to an embodiment of the present application.

For clarity, the LTE system is used only as an example herein for description. FIG. 1 is a system architectural diagram according to an embodiment of the present application. Referring to FIG. 1, in an LTE system, evolved terrestrial radio access (E-UTRAN) serves as a radio access network, and an evolved packet core (EPC) serves as a core network.

The EPC may include a mobility management entity (MME) and a serving gateway (S-GW). The MME is responsible for signaling processing, and the S-GW is responsible for data processing. The E-UTRAN may include an evolved nodeB (eNodeB), and the evolved nodeB is an apparatus that is deployed on the E-UTRAN to provide a wireless communication function to a terminal. The eNodeB is a base station, and eNodeBs may include various forms of macro base stations, micro base stations, relay stations, access points, or the like. In a system that uses a different radio access technology, a name of a device having a function that is the same as that of the eNodeB may be different. For example, in a 3rd generation (3G) network, the device is referred to as a nodeB (node B). Terminals may include various handheld devices, in-vehicle devices, wearable devices, or computing devices having the wireless communication function, other processing devices connected to a wireless modem, various forms of mobile stations (MS) or user equipment (UE), or the like.

The terminal is connected to the eNodeB by using a wireless interface Uu interface. eNodeBs are connected to each other by using a standard interface X2 interface that implements communication between base stations. The eNodeB is connected to the EPC by using an S1 interface. The eNodeB is connected to the MME by using an S1-MME interface, to implement control signaling communication, and the eNodeB is connected to the S-GW by using an S1-U interface, to implement user data communication.

In this application, the nouns "network" and "system" are alternately used, but a person skilled in the art can understand meanings thereof. The term "communication" refers to communication in a broad sense, to be specific, communication including data and control signaling, for example, measurement command communication. For the term "timing", the person skilled in the art can also understand a meaning thereof, to be specific, a start moment at which a symbol is sent, or a start moment at which a symbol is received, and the term "timing" is a concept of a time point. In addition, when needing to send a signal to a receiver, a sender maps the signal to a symbol to send out the signal, and this behavior may be briefly referred to as sending the symbol by the sender.

In the prior art, in most wireless communication scenarios, a wireless air interface technology relates to air interface communication between a base station and a terminal. A new service requirement enables air interface communication between base stations (this communication is different from communication between base stations by using the X2 interface for communication with each other, and is usually used for transmitting control signaling with relatively small data traffic), and air interface communication between terminals (in the air interface communication between terminals described herein, an end-to-end (device to device, D2D) communications technology is not used, and the timing used in the communication between a base station and a terminal continues to be used) to attract attention.

For example, the following two scenarios are considered.

Scenario 1: In a dynamic time division duplex (TDD) system, dynamic configuration of uplink and downlink subframes not only optimizes network resource utilization, but also causes a problem of cross link interference.

Figure 2A:
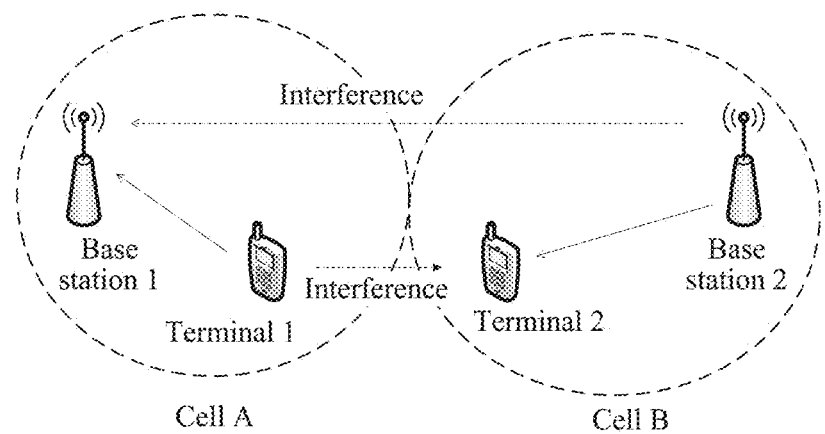
FIG. 2(a) is an application scenario diagram according to an embodiment of the present application.
Figure 2B:
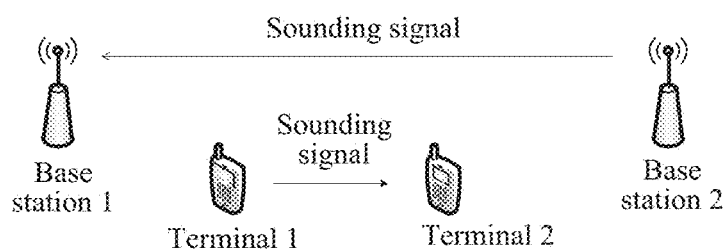
FIG. 2(b) is another application scenario diagram according to an embodiment of the present application.

As shown in FIG. 2(a), at a moment, a cell A is located in an uplink subframe and schedules a terminal 1 on an edge of the cell A to send uplink data to a base station 1. A cell B is located in a downlink subframe, and schedules a terminal 2 that is on an edge of the cell B and is relatively close to the terminal 1, to receive downlink data of a base station 2. In this case, the data sending of the terminal 1 severely interferes with the data receiving of the terminal 2, and in addition, the base station 2 during downlink transmitting severely interferes with the base station 1 during uplink receiving. In this case, as shown in FIG. 2(b), before data communication is performed, the base station 2 needs to send a sounding signal to the base station 1, and the terminal 1 needs to send a sounding signal to the terminal 2, so that the base station 1 and the terminal 2 perform channel estimation based on the sounding signal, and suppress, avoid, or eliminate interference.

Figure 3:
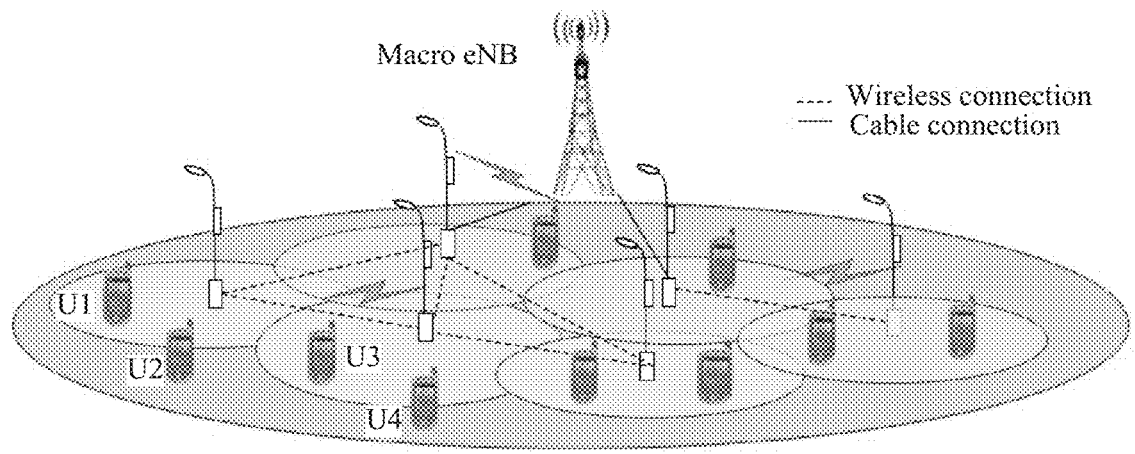
FIG. 3 is still another application scenario diagram according to an embodiment of the present application.

Scenario 2: As shown in FIG. 3, a macro base station (macro eNB) controls a plurality of small cells, and only some small cells have cable connections (solid lines in the figure) to the macro base station. In this case, the other small cells can send data of a terminal to the macro base station by using only wireless backhaul (dashed lines in the figure) between the small cells.

The foregoing two scenarios both relate to communication between base stations or communication between terminals. If conventional air interface communication between a base station and a terminal may be referred to as communication between non-peer-to-peer entities, the communication between base stations or the communication between terminals may be referred to as communication between peer-to-peer entities. Certainly, this communication between peer-to-peer entities is not limited to the foregoing two particular scenarios, and the foregoing two particular scenarios serve as only examples for better understanding the technical solutions of the present application.

However, in an existing TDD technology, when entities such as a base station and a terminal perform receive/transmit transition, a transition delay inevitably exists. For example, a receive-to-transmit transition delay of a base station results in that, when communication between base stations is performed, a time domain offset Tk between base stations is generated, to be specific, a deviation generated in time domain for a corresponding transmit start moment and a receive start moment when a symbol is transmitted between the base stations. A transmit-to-receive transition delay of a terminal results in that, when communication between terminals is performed, a time domain offset Tu between terminals is generated, to be specific, a deviation generated in time domain for a corresponding transmit start moment and a receive start moment when a symbol is transmitted between the terminals. Tk and Tu are both greater than a time length of a cyclic prefix (CP) of each symbol.

Based on the foregoing reason, when the air interface communication between base stations or between terminals is performed, large misplacement in time domain occurs for receiving and sending of a symbol, consequently causing a receiver to be not capable of correctly receiving the signal.

Figure 4:
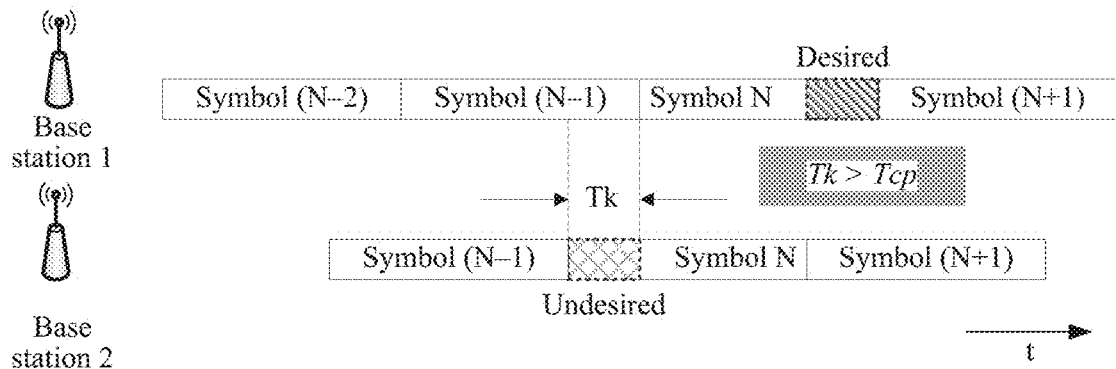
FIG. 4 is a schematic diagram of a time domain in which a symbol is received and sent between base stations according to an embodiment of the present application.
Figure 5:
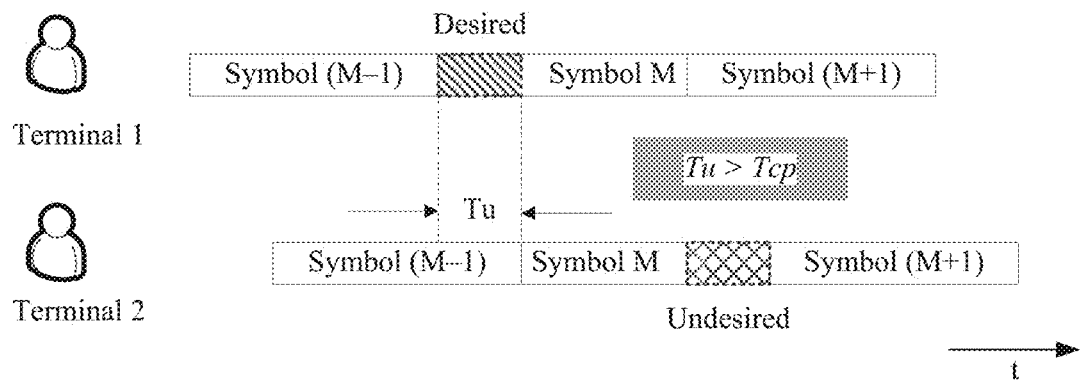
FIG. 5 is a schematic diagram of a time domain in which a symbol is received and sent between terminals according to an embodiment of the present application.

As shown in FIG. 4, the base station 1 needs to send a signal to the base station 2 on a symbol N. Due to existence of Tk, a start moment at which the base station 1 sends the symbol N is later than a start moment at which the base station 2 receives the symbol N. Tk is greater than a CP length (Tcp) of the symbol N, and consequently the signal cannot be completely and correctly received by the base station 2. Similarly, as shown in FIG. 5, the terminal 1 needs to send a signal to the terminal 2 on a symbol M. Due to existence of Tu, a start moment at which the terminal 1 sends the symbol M is earlier than a start moment at which the terminal 2 receives the symbol M. Tu is greater than a CP length of the symbol M, and consequently the signal cannot be completely and correctly received by the terminal 2.

Therefore, a technical solution is urgently needed to resolve the foregoing problem.

Figure 6:
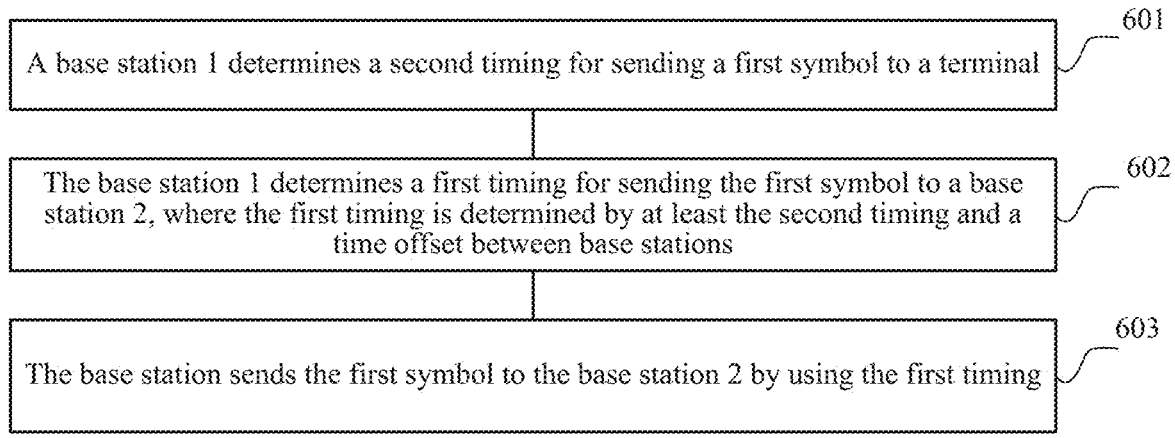
FIG. 6 is a schematic flowchart of a signal communication method according to an embodiment of the present application.

Based on the foregoing problem, FIG. 6 provides a schematic flowchart of a signal communication method. The method may be applied to the system architecture shown in FIG. 1 and the application scenarios shown in FIG. 2(a), FIG. 2 (b), and FIG. 3. The method includes the following steps:

601: A base station 1 determines a second timing for sending a first symbol to a terminal.

602: The base station 1 determines a first timing for sending the first symbol to a base station 2, where the first timing is at least determined by the second timing and a time offset between base stations.

603: The base station 1 sends the first symbol to the base station 2 by using the first timing.

A feasible method to resolve the foregoing problem is to re-configure a transmit timing of the first symbol, so that when the first symbol is received and sent between the base station 1, namely, a sender of the first symbol, and the base station 2, namely, a receiver of the first symbol, alignment in time domain is achieved.

First, it should be noted that, the symbol N in FIG. 4 is the first symbol in the foregoing method steps.

As shown in FIG. 4, the base station 1 needs to send a signal to the base station 2 on the symbol N. However, a start moment at which a side of the base station 2 receives the symbol N is earlier than a start moment at which a side of the base station 1 sends the symbol N by a time duration Tk in time domain. The time duration Tk is the time offset between base stations.

Optionally, the time offset between base stations is determined by a fixed timing advance offset (Fixed timing advance offset) $N_{TAoffset}$, for example, is $N_{TAoffset} \cdot T_s$, where $T_s$ is a basic time unit; or the time offset between base stations is determined by $N_{TAoffset}$ and a distance between base stations, where a larger distance between base stations indicates a larger time domain offset between the base stations.

It should be noted that, $N_{TAoffset}$ and $T_s$ are technical terms that can be understood by a person skilled in the art, and for definitions thereof, refer to the 3rd generation partnership project (3GPP) standard (TS) 36.211.

To achieve an objective that receiving and sending of a signal can be aligned in time domain, the base station 1 needs to determine the second timing for sending the symbol N to the terminal in 601. This step already exists in the prior art. In 602, the base station 1 further determines the first timing for sending the symbol N to the base station 2. The first timing is at least determined by the second timing determined in 601 and the time offset between base stations. In other words, the first timing is formed by adjusting the second timing by the time offset between base stations in time domain. In 603, the base station 1 sends the symbol N to the base station 2 by using the first timing determined in 602.

As shown in FIG. 4, a symbol on the side of the base station 1 is later than a symbol on the side of the base station 2 in time domain. Therefore, in an implementation, the first timing is earlier than the second timing, in other words, the first timing is formed by moving the second timing forward in time domain by the time offset between base stations.

Optionally, specifically, a time duration by which the first timing is earlier than the second timing is $N_{TAoffset} \cdot T_s$. In this case, because the base station 1 is relatively close to the base station 2, no additional time offset is caused, or such an additional time offset can be ignored.

When the base station 1 is relatively far from the base station 2 and an additional time offset that is caused cannot be ignored, optionally, a time duration by which the first timing is earlier than the second timing is a sum of $N_{TAoffset} \cdot T_s$ and a time offset corresponding to the distance between base stations.

The foregoing technical solution provided by the present application only needs to re-configure the transmit timing of the symbol N, in other words, can resolve a technical problem by only re-configuring the transmit timing of the side of the base station 1, and therefore is a relatively efficient solution. The base station 1 sends the symbol N by using the first timing, and the transmit timing of the symbol N is earlier by Tk, so that sending and receiving of the symbol N are aligned in time domain. Therefore, a first signal added on the symbol N by the base station 1 on a transmit side can be completely and correctly received on a receive side by the base station 2, thereby improving quality of communication between the two.

In an implementation, a second symbol before the first symbol, namely, the symbol N, sent by the base station 1 is not used for signal communication, and the second symbol is a symbol N−1. An original timing mechanism is still used for the second symbol, and therefore a resource corresponding to a latter part of the second symbol is occupied by a former part of the first symbol after the first timing is used. Therefore, the base station 1 needs to stop signal communication to another communications device on the second symbol for which the existing timing mechanism is used, to avoid a resource use conflict. In another implementation, a plurality of consecutive symbols before the first symbol are not used for signal communication, to be specific, the symbol N−1, a symbol N−2, . . . are not used for signal communication. When a plurality of consecutive symbols are not used for signal communication, a symbol quantity may be randomly set, provided that a time duration corresponding to the plurality of symbols is greater than or equal to Tk. Actually, a length of Tk is greater than a CP length of each symbol but is less than a length of each symbol. Therefore, when a solution in which the second symbol is not used for communication is used, in other words, when the base station 1 sends the first symbol by using the first timing, only a resource on the symbol N−1 is reserved, so that not only a requirement of this solution is satisfied, but also network resource utilization can be increased to the greatest extent, and communication between the base station 1 and another device is not affected.

Figure 7A:
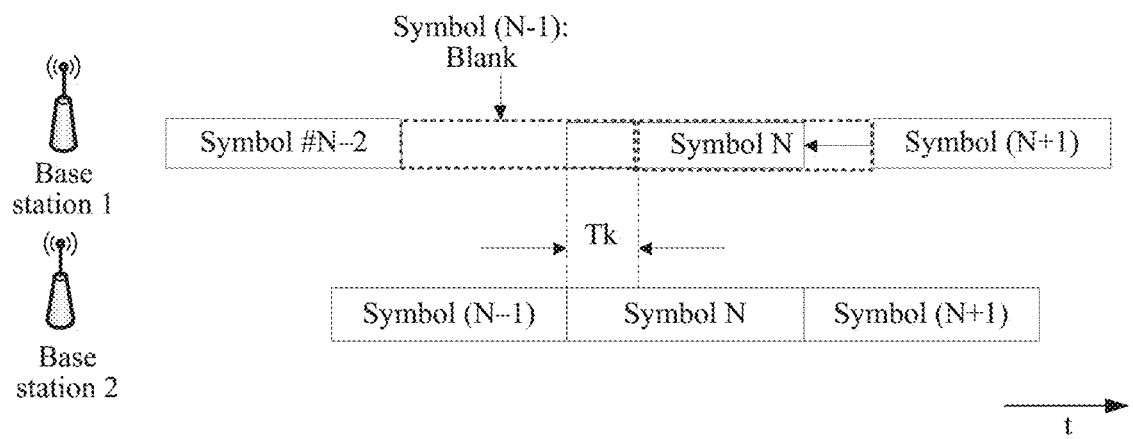
FIG. 7(a) is another schematic diagram of a time domain in which a symbol is received and sent between base stations according to an embodiment of the present application.

In an embodiment shown in FIG. 7(a), the base station 1 sends the symbol N to the base station 2, and to avoid a resource use conflict, a resource on the symbol N−1, namely, a symbol before the symbol N, is reserved on the base station 1. The base station 1 sends the symbol N to the base station 2 by using the first timing. In this case, a start time at which the symbol N is sent is earlier than an original start time at which the symbol N is sent by the time duration Tk, and in this way, the receiving and sending of the symbol N are aligned in time domain. Therefore, the first signal that is to be transmitted to the base station 2 and that is added on the symbol N by the base station 1 on the transmit side can be completely and correctly received on the receive side by the base station 2, thereby improving the quality of communication between the two.

In the foregoing technical solution provided in this embodiment of the present application, the receiver of the first symbol, namely, the base station 2, may receive, by using a timing at which the base station 2 receives a first symbol sent by a communications device (including the terminal and another terminal) in the prior art, the first symbol sent by the base station 1.

In an implementation, to enable the sending and receiving of the symbol N to be aligned in time domain, both a transmit timing and a receive timing of the first symbol may be further re-configured. In this case, it is determined that a first timing used when the base station 1 sends the first symbol is earlier than the second timing by a time duration Ta. In addition, the timing used when the base station 2 receives the first symbol is re-configured, and the re-configured timing is a fifth timing. The fifth timing is formed by being later than a sixth timing at which the base station 2 receives the first symbol sent by the communications device (including the terminal and another terminal) by a time duration Tb in time domain. Ta+Tb=time offset between base stations, that is, Ta+Tb=Tk, needs to be satisfied. Such a solution can also satisfy that the receiving and sending of the symbol N are aligned in time domain.

Figure 7B:
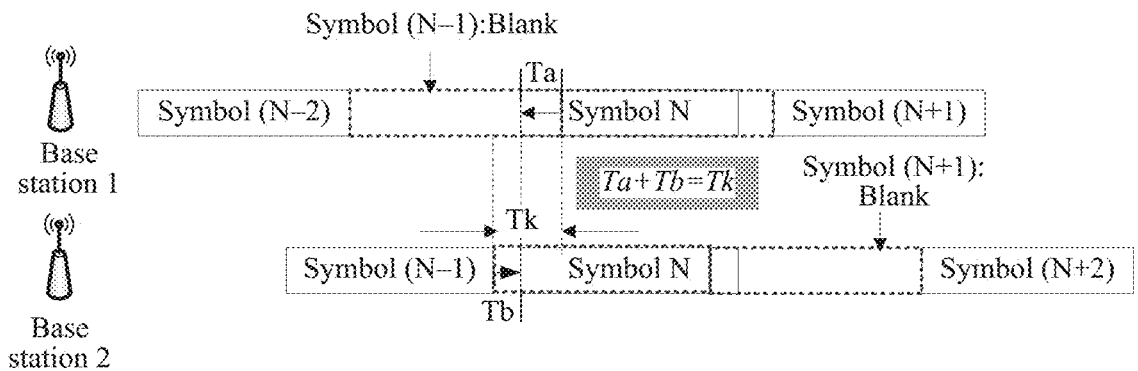
FIG. 7(b) is another schematic diagram of a time domain in which a symbol is received and sent between base stations according to an embodiment of the present application.

In an embodiment shown in FIG. 7(b), the base station 1 sends the symbol N to the base station 2, and to avoid a resource use conflict, a resource on the symbol N−1, namely, a symbol before the symbol N, is reserved on the base station 1. The base station 1 sends the first symbol to the base station 2 on the symbol N by using a first timing. In this case, a start time at which the symbol N is sent is earlier than an original start time at which the symbol N is sent by Ta, and Ta<Tk. Therefore, a side of the base station 2 further needs to receive, by using the fifth timing, the symbol N sent by the base station 1, and the receive timing of the symbol N needs to be later by Tb, where Ta+Tb=Tk, so that the receiving and sending of the symbol N are aligned in time domain, and in addition, a resource on a symbol N+1 is reserved on the base station 2. Therefore, a signal that is to be transmitted to the base station 2 and that is added on the symbol N by the base station 1 on the transmit side can be completely and correctly received on the receive side by the base station 2, thereby improving the quality of communication between the two.

Figure 8:
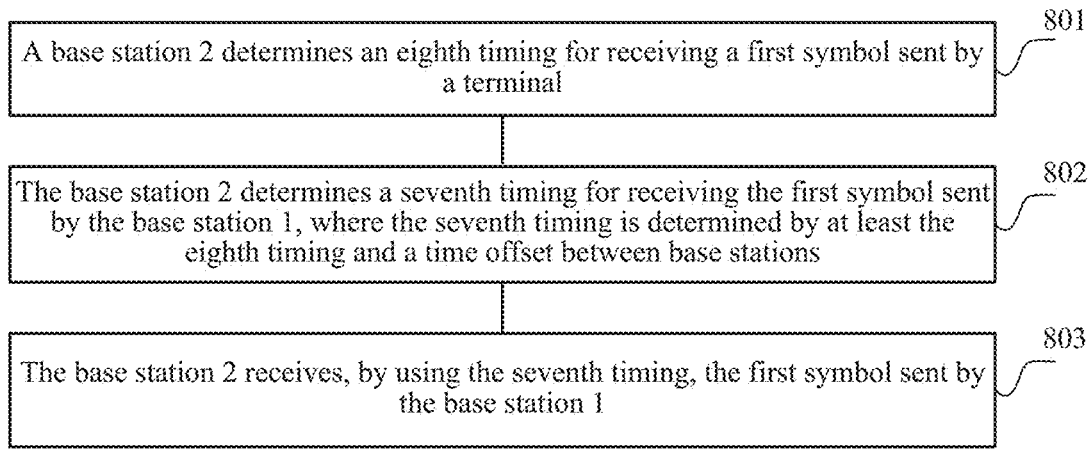
FIG. 8 is another schematic flowchart of a signal communication method according to an embodiment of the present application.

FIG. 8 provides another schematic flowchart of a signal communication method. The method may be applied to the system architecture shown in FIG. 1 and the application scenarios shown in FIG. 2(a), FIG. 2(b), and FIG. 3. The method includes the following steps:

801: A base station 2 determines an eighth timing for receiving a first symbol sent by a terminal.

802: The base station 2 determines a seventh timing for receiving the first symbol sent by the base station 1, where the seventh timing is at least determined by the eighth timing and a time offset between base stations.

803: The base station 2 receives, by using the seventh timing, the first symbol sent by the base station 1.

The method provided in the embodiment of FIG. 6, FIG. 7(a), or FIG. 7(b), or the method for re-configuring the receive timing of the first symbol may be used as a method for resolving the foregoing problem. They have similar means, so that when the first symbol is received and sent between the base station 1, namely, a sender of the first symbol, and the base station 2, namely, a receiver of the first symbol, alignment in time domain is achieved. In 801, the base station 2 needs to determine the eighth timing for receiving the first symbol sent by the terminal. This step already exists in the prior art. In 802, the base station 2 further determines the seventh timing for receiving the first symbol sent by the base station 1. The seventh timing is at least determined by the eighth timing determined in 801 and the time offset between base stations. In other words, the seventh timing is formed by adjusting the eighth timing by the time offset between base stations in time domain. In 803, the base station 2 receives, by using the seventh timing determined in 802, the first symbol sent by the base station 1.

As shown in FIG. 4, a symbol on a side of the base station 2 is earlier than a symbol on a side of the base station 1 in time domain. Therefore, in an implementation, the seventh timing is later than the eighth timing, in other words, the seventh timing is formed by moving the eighth timing backward in time domain by the time offset between base stations.

For a description related to the time offset between base stations, refer to related content in the method embodiment of FIG. 6, and details are not described herein again.

It should be noted that, the symbol N in FIG. 4 is the first symbol in the foregoing method steps.

In an implementation, a fifth symbol after the first symbol, namely, the symbol N, received by the base station 2 is not used for signal communication, and the second symbol is a symbol N+1. An original timing mechanism is still used for the fifth symbol, and therefore a resource corresponding to a former part of the fifth symbol is occupied by a latter part of the first symbol after the seventh timing is used. Therefore, the base station 2 needs to stop signal communication to another communications device on the fifth symbol for which the existing timing mechanism is used, to avoid a resource use conflict. In another implementation, a plurality of consecutive symbols after the first symbol are not used for signal communication, to be specific, the symbol N+1, a symbol N+2, . . . are not used for signal communication. When a plurality of consecutive symbols are not used for signal communication, a symbol quantity may be randomly set, provided that a time duration corresponding to the plurality of symbols is greater than or equal to Tk. Actually, a length of Tk is greater than a CP length of each symbol but is less than a length of each symbol. Therefore, when a solution in which the fifth symbol is not used for communication is used, in other words, when the base station 2 receives the first symbol by using the seventh timing, only a resource on the symbol N+1 is reserved, so that not only a requirement of this solution is satisfied, but also network resource utilization can be increased to the greatest extent, and communication between the base station 2 and another device is not affected.

Figure 9:
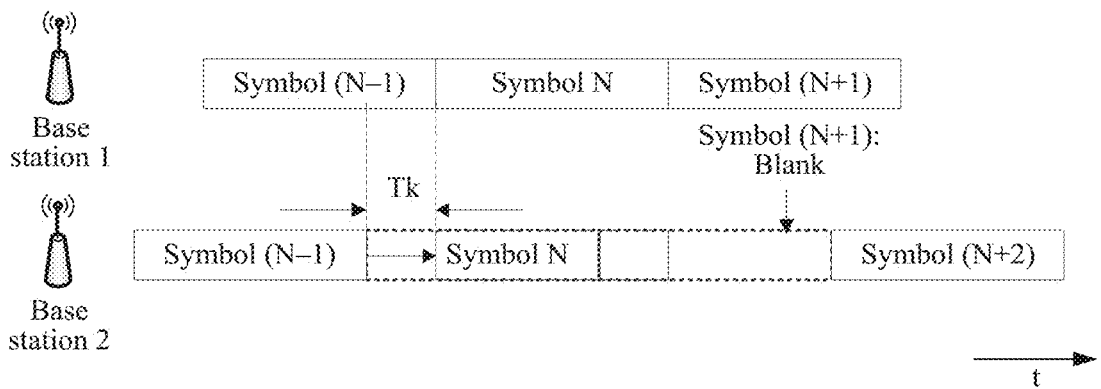
FIG. 9 is another schematic diagram of a time domain in which a symbol is received and sent between base stations according to an embodiment of the present application.

In an embodiment shown in FIG. 9, the base station 2 receives the symbol N sent by the base station 1, and to avoid a resource use conflict, a resource on the symbol N+1, namely, a symbol after the symbol N is received, is reserved on the base station 2. The seventh timing used by the base station 2 enables a time at which the symbol N is received to be later than an original time at which the symbol N is received by a time duration Tk, and in this way, the receiving and sending of the symbol N are aligned in time domain. Therefore, the first signal that is to be sent to the base station 2 and that is added on the symbol N by the base station 1 on the transmit side can be completely and correctly received on the receive side by the base station 2, thereby improving the quality of communication between the two.

In the foregoing technical solution provided in this embodiment of the present application, the sender of the first symbol, namely, the base station 1, may send, by using a timing at which the base station 1 sends the first symbol to a communications device (including the terminal and another terminal) in the prior art, the first symbol to the base station 2.

In the foregoing embodiments of the present application, a problem of misplacement of signal receiving and sending between base stations can be resolved, and a problem of misplacement of signal receiving and sending between terminals also needs to be resolved.

Figure 10:
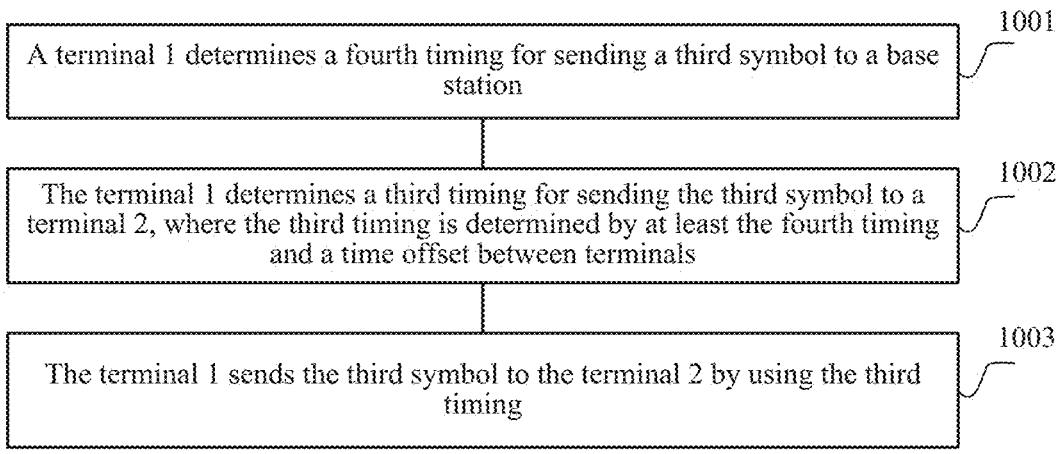
FIG. 10 is another schematic flowchart of a signal communication method according to an embodiment of the present application.

FIG. 10 provides a schematic flowchart of a signal communication method. The method may be applied to the system architecture shown in FIG. 1 and the application scenarios shown in FIG. 2(*a*) and FIG. 2(*b*). The method includes the following steps:

1001: A terminal 1 determines a fourth timing for sending a third symbol to a base station.

1002: The terminal 1 determines a third timing for sending the third symbol to a terminal 2, where the third timing is at least determined by the fourth timing and a time offset between terminals.

1003: The terminal 1 sends the third symbol to the terminal 2 by using the third timing.

Similar to the embodiment of the present application in FIG. 6, in this embodiment of the present application, a transmit timing of the third symbol needs to be re-configured, so that when the third symbol is received and sent between the terminal 1, namely, a sender of the first symbol, and the terminal 2, namely, a receiver of the first symbol, alignment in time domain is achieved.

First, it should be noted that, the symbol M in FIG. 5 is the third symbol in the foregoing method steps.

As shown in FIG. 5, the terminal 1 needs to send a signal to the terminal 2 on the symbol M. However, a start moment at which the terminal 2 receives the symbol M is later than a start moment at which a side of the terminal 1 sends the symbol M by a time duration Tu in time domain. The time duration Tu is the time offset between terminals.

Optionally, the time offset between terminals is determined by $N_{TAoffset}$, for example, is $N_{TAoffset} \cdot T_s$; or the time offset between terminals is determined by $N_{TAoffset}$ and the distance between terminals, where a larger distance between terminals indicates a larger time offset between the terminals.

To achieve an objective that receiving and sending of a signal can be aligned in time domain, the terminal 1 needs to determine the fourth timing for sending the symbol M to the base station in 1001. This step already exists in the prior art. In 1002, the terminal 1 further determines the third timing for sending the symbol M to the terminal 2. The third timing is at least determined by the fourth timing determined in 1001 and the time offset between terminals. In other words, the third timing is formed by adjusting the fourth timing by the time offset between terminals in time domain. In 1003, the terminal 1 sends the symbol M to the terminal 2 by using the third timing determined in 1002.

As shown in FIG. 5, a symbol on a side of the terminal 1 is earlier than a symbol on a side of the terminal 2 in time domain. Therefore, in an implementation, the third timing is later than the fourth timing, in other words, the third timing is formed by moving the fourth timing backward in time domain by the time offset between terminals.

Optionally, specifically, a time duration by which the third timing is later than the fourth timing is $N_{TAoffset} \cdot T_s$. In this case, because the terminal 1 is relatively close to the terminal 2, no additional time offset is caused, or such an additional time offset can be ignored.

When the terminal 1 is relatively far from the terminal 2 and an additional time offset that is caused cannot be ignored, optionally, a time duration by which the third timing is later than the fourth timing is a sum of $N_{TAoffset} \cdot T_s$ and a time offset corresponding to the distance between terminals.

The foregoing technical solution provided by the present application only needs to re-configure the transmit timing of the symbol M, in other words, can resolve a technical problem by only re-configuring the transmit timing of the side of the terminal 1, and therefore is a relatively efficient solution. The terminal 1 sends the symbol M by using the third timing, and the transmit timing of the symbol M is later by Tu, so that sending and receiving of the symbol M are aligned in time domain. Therefore, a second signal added on the symbol M by the terminal 1 on a transmit side can be completely and correctly received on a receive side by the terminal 2, thereby improving quality of communication between the two.

In another implementation, a fourth symbol after the third symbol, namely, the symbol M, sent by the terminal 1 is not used for signal communication, and the fourth symbol is a symbol M+1. An original timing mechanism is still used for the fourth symbol, and therefore a resource corresponding to a former part of the fourth symbol is occupied by a latter part of the third symbol after the third timing is used. Therefore, the terminal 1 needs to stop signal communication to another communications device on the third symbol for which the existing timing mechanism is used, to avoid a resource use conflict. In another implementation, a plurality of consecutive symbols after the third symbol are not used for signal communication, to be specific, the symbol M+1, a symbol M+2, . . . are not used for signal communication. When a plurality of consecutive symbols are not used for signal communication, a symbol quantity may be randomly set, provided that a time duration corresponding to the plurality of symbols is greater than or equal to Tu. Actually, a length of Tu is greater than a CP length of each symbol but is less than a length of each symbol. Therefore, when a solution in which the fourth symbol is not used for communication is used, in other words, when the terminal 1 sends the third symbol by using the third timing, only a resource on the symbol M+1 is reserved, so that not only a requirement of this solution is satisfied, but also network resource utilization can be increased to the greatest extent, and communication between the terminal 1 and another device is not affected.

Figure 11A:
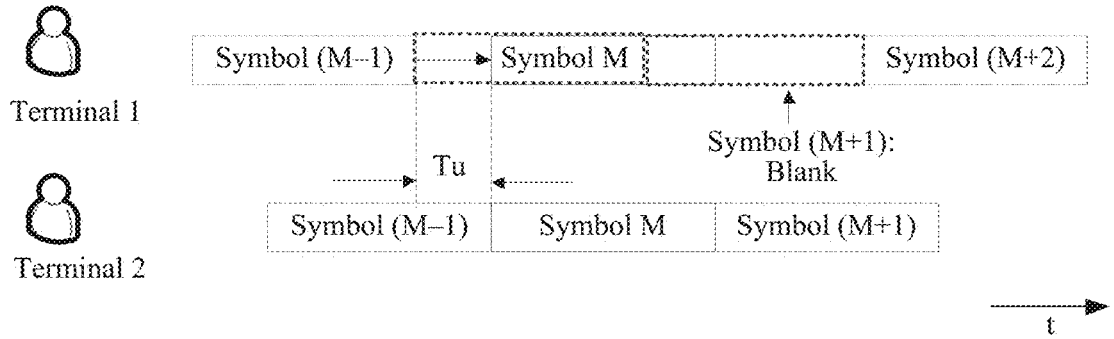
FIG. 11(a) is another schematic diagram of a time domain in which a symbol is received and sent between terminals according to an embodiment of the present application.

In an embodiment shown in FIG. 11(a), the terminal 1 sends the symbol M to the terminal 2, and to avoid a resource use conflict, a resource on the symbol M+1, namely, a symbol after the symbol M, is reserved on the terminal 1. The terminal 1 sends the symbol M to the terminal 2 by using the third timing. In this case, a start time at which the symbol M is sent is later than an original start time at which the symbol M is sent by the time duration Tu, and in this way, the receiving and sending of the symbol M are aligned in time domain. Therefore, the third signal that is to be sent to the terminal 2 and that is added on the symbol M by the terminal 1 on the transmit side can be completely and correctly received on the receive side by the terminal 2, thereby improving the quality of communication between the two.

In the foregoing technical solution provided in this embodiment of the present application, the receiver of the third symbol, namely, the terminal 2, may receive, by using a timing at which the terminal 2 receives a third symbol sent by a communications device (including the base station and another base station) in the prior art, the third symbol sent by the terminal 1.

In an implementation, to enable the sending and receiving of the symbol M to be aligned in time domain, both a transmit timing and a receive timing of the third symbol may be further re-configured. In this case, it is determined that a third timing used when the terminal 1 sends the third symbol is later than the fourth timing by a time duration Tc. In addition, the timing used when the terminal 2 receives the third symbol is re-configured, and the re-configured timing is a ninth timing. The ninth timing is formed by being earlier than a tenth timing at which the terminal 2 receives the third symbol sent by the base station by Tb in time domain. Tc+Td=time offset between terminals, that is, Tc+Td=Tu, needs to be satisfied. Such a solution can also satisfy that the receiving and sending of the symbol M are aligned in time domain.

Figure 11B:
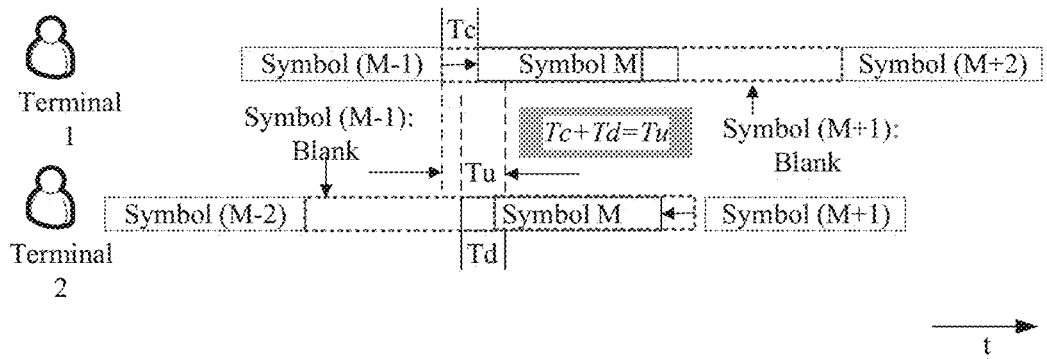
FIG. 11(b) is another schematic diagram of a time domain in which a symbol is received and sent between terminals according to an embodiment of the present application.

In an embodiment shown in FIG. 11(b), the terminal 1 sends the symbol M to the terminal 2, and to avoid a resource use conflict, a resource on the symbol M+1, namely, a symbol after the symbol M, is reserved on the terminal 1. The terminal 1 sends the symbol M to the terminal 2 by using the third timing. In this case, a start time at which the symbol M is sent is later than an original start time at which the symbol M is sent by Tc. A side of the terminal 2 further needs to receive, by using the ninth timing, the symbol M sent by the terminal 1, and the receive timing of the symbol M needs to be earlier by Td, where Tc+Td=Tu, so that the receiving and sending of the symbol M are aligned in time domain. In addition, a resource on the symbol M−1 is reserved on the terminal 2. Therefore, a third signal that is to be transmitted to the terminal 2 and that is added on the symbol M by the terminal 1 on the transmit side can be completely and correctly received on the receive side by the terminal 2, thereby improving the quality of communication between the two.

Figure 12:
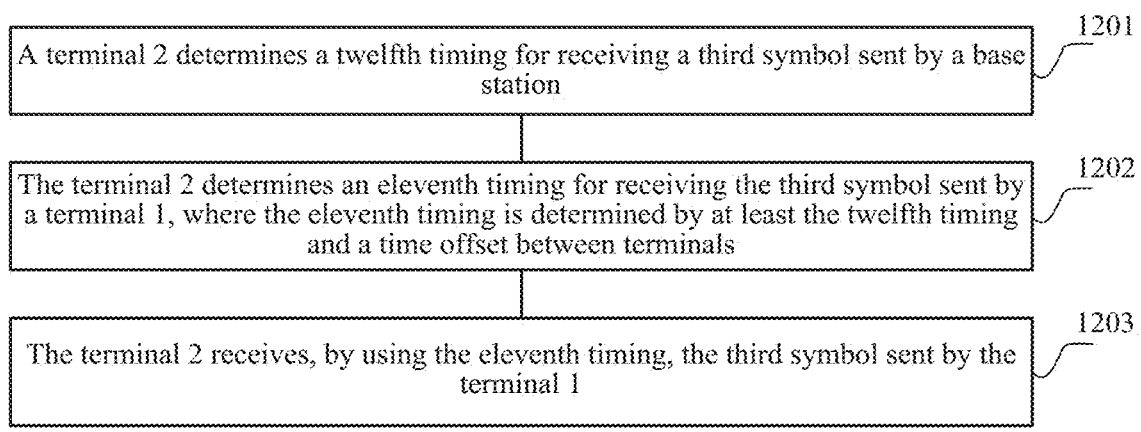
FIG. 12 is still another schematic flowchart of a signal communication method according to an embodiment of the present application.

FIG. 12 provides still another schematic flowchart of a signal communication method. The method may be applied to the system architecture shown in FIG. 1 and the application scenarios shown in FIG. 2(a) and FIG. 2(b). The method includes the following steps:

1201: A terminal 2 determines a twelfth timing for receiving a third symbol sent by a base station.

1202: The terminal 2 determines an eleventh timing for receiving the third symbol sent by a terminal 1, where the eleventh timing is at least determined by the twelfth timing and a time offset between terminals.

1203: The terminal 2 receives, by using the eleventh timing, the third symbol sent by the terminal 1.

Implementations of the technical solution in this embodiment of the present application are similar to those of the technical solution in the embodiment shown in FIG. 8. A difference is that, in FIG. 8, a symbol on the side of the base station 2 is earlier than a symbol on the side of the base station 1 in time domain, but in this embodiment of the present application, a symbol on a side of the terminal 2 is later than a symbol on a side of the terminal 1 in time domain. In other words, to achieve an objective that receiving and sending of signal can be aligned in time domain, the terminal 2 needs to determine the twelfth timing for receiving the third symbol sent by the base station in 1201. This step already exists in the prior art. In 1202, the terminal 2 further determines the eleventh timing for receiving the third symbol sent by the terminal 1. The eleventh timing is at least determined by the twelfth timing determined in 1201 and the time offset between terminals. In other words, the eleventh timing is formed by adjusting the twelfth timing by the time offset between terminals in time domain. In 1203, the terminal 2 receives, by using the eleventh timing determined in 1202, the third symbol sent by the terminal 1.

In an implementation, the eleventh timing is earlier than the twelfth timing. In other words, the eleventh timing is formed by moving the twelfth timing forward in time domain by the time offset between terminals.

For a description related to the time offset between terminals, refer to related content in the method embodiment of FIG. 10, and details are not described herein again.

It should be noted that, the symbol M in FIG. 5 is the third symbol in the foregoing method steps.

In an implementation, a sixth symbol before the third symbol, namely, the symbol M, received by the terminal 2 is not used for signal communication, and the sixth symbol is a symbol M−1. An original timing mechanism is still used for the sixth symbol, and therefore a resource corresponding to a latter part of the sixth symbol is occupied by a former part of the third symbol after the eleventh timing is used. Therefore, the terminal 2 needs to stop signal communication to another communications device on the sixth symbol for which the existing timing mechanism is used, to avoid a resource use conflict. In another implementation, a plurality of consecutive symbols before the third symbol are not used for signal communication, to be specific, the symbol M−1, a symbol M−2, . . . are not used for signal communication. When a plurality of consecutive symbols are not used for signal communication, a symbol quantity may be randomly set, provided that a time duration corresponding to the plurality of symbols is greater than or equal to Tu. Actually, a length of Tu is greater than a CP length of each symbol but is less than a length of each symbol. Therefore, when a solution in which the sixth symbol is not used for communication is used, in other words, when the terminal 2 receives the third symbol by using the eleventh timing, only a resource on the symbol M−1 is reserved, so that not only a requirement of this solution is satisfied, but also network resource utilization can be increased to the greatest extent, and communication between the terminal 2 and another device is not affected.

Figure 13:
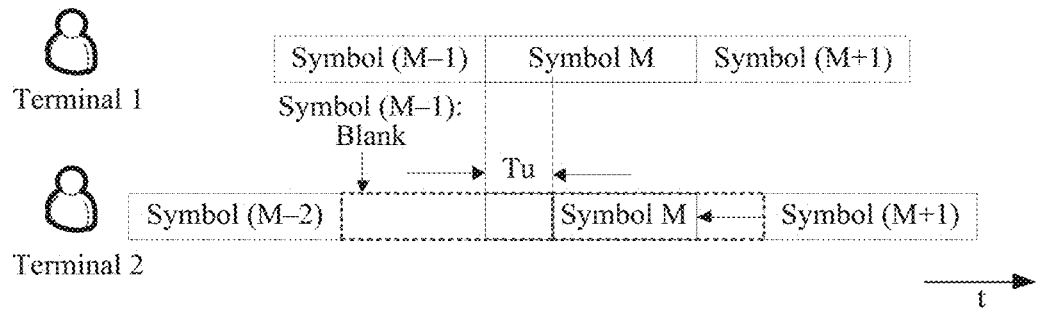
FIG. 13 is still another schematic diagram of a time domain in which a symbol is received and sent between terminals according to an embodiment of the present application.

In an embodiment shown in FIG. 13, the terminal 2 receives the symbol M sent by the terminal 1, and to avoid a resource use conflict, a resource on the symbol M−1, namely, a symbol before the symbol M is received, is reserved on the terminal 2. The eleventh timing used by the terminal 2 enables a time at which the symbol M is received to be earlier than an original time at which the symbol M is received by a time duration Tu, and in this way, the receiving and sending of the symbol M are aligned in time domain. Therefore, a third signal that is to be transmitted to the terminal 2 and that is added on the symbol M by the terminal 1 on the transmit side can be completely and correctly received on the receive side by the terminal 2, thereby improving the quality of communication between the two.

In the foregoing technical solution provided in this embodiment of the present application, the sender of the third symbol, namely, the terminal 1, may send, by using a timing at which the terminal 1 sends the third symbol to a communications device (including the base station and another base station) in the prior art, the third symbol to the terminal 2.

It should be noted that, in the embodiments of FIG. 6 to FIG. 13, the provided timings may be configured in real time by using a network management system, for example, may be implemented by using code that implements the timing configurations in this embodiment, or may be preset and stored in a base station. A person skilled in the art may know various equivalent solutions for implementing the timing configurations in the embodiments of the present application.

In addition, in all the foregoing embodiments of the present application, the descriptions are provided by using an example in which a signal sent by the base station 1 to the base station 2 is sent by being carried on the symbol N on the side of the base station 1, or a signal sent by the terminal 1 to the terminal 2 is sent by being carried on the symbol M on the side of the terminal 1. Actually, the signal sent by the base station 1 to the base station 2 or the signal sent by the terminal 1 to the terminal 2 may fail to be completely carried on one symbol. In this case, the signal may be carried on a plurality of symbols, in other words, herein the first symbol and the third symbol may alternatively be replaced with a plurality of consecutive symbols. This is not limited herein.

It should be further pointed out that, in the embodiments of the present application, the technical solutions for resolving technical problems are described by using communication between base stations and communication between terminals as an example. Actually, when a technical problem similar to those pointed out in this application occurs in communication between any two devices, the technical problem may be resolved by using a method similar to the technical solutions of the present application in FIG. 6 to FIG. 13 of this application, without going beyond the protection scope of the present application.

In the foregoing, the solutions provided in the embodiments of the present application are described mainly from a perspective of interaction between base stations and terminals. It may be understood that, to implement the foregoing functions, a base station, a terminal, or the like, includes a corresponding hardware structure and/or software module performing the functions. A person of ordinary skill in the art should easily be aware that, in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

Figure 14:
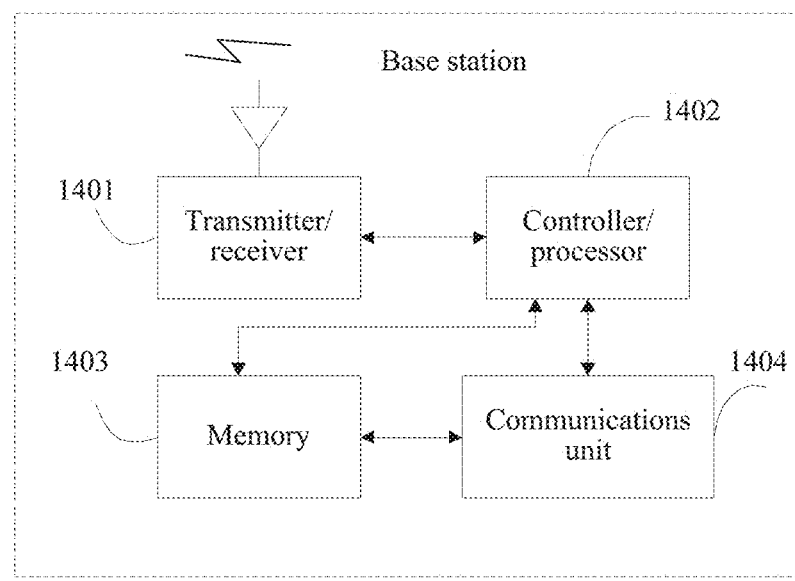
FIG. 14 is a schematic structural diagram of a base station according to an embodiment of the present application.

FIG. 14 is a possible schematic structural diagram of the base station provided in the foregoing embodiments.

The base station includes a transmitter/receiver 1401, a controller/processor 1402, a memory 1403, and a communications unit 1404. The transmitter/receiver 1401 is configured to: support information receiving and sending between a base station and a terminal, and support radio communication between the terminal and another terminal. The controller/processor 1402 performs various functions used for communicating with the terminal. On an uplink, an uplink signal from the terminal is received by using an antenna, adjusted by the receiver 1401, and further processed by the controller/processor 1402, to restore service data and signaling information that are sent by the terminal. On a downlink, service data and a signaling message are processed by the controller/processor 1402, and adjusted by the transmitter 1401, to generate a downlink signal, and the downlink signal is transmitted to the terminal by using an antenna. The controller/processor 1402 further performs a processing process related to the base station 1 or the base station 2 in FIG. 6 to FIG. 13 and/or another process used for the technology described in this application. The memory 1403 is configured to store program code and data of the base station. The communications unit 1404 is configured to support communication between the base station and another network device.

It may be understood that FIG. 14 shows merely a simplified design of the base station. In an actual application, the base station may include any quantity of transmitters, receivers, processors, controllers, memories, communications units, and the like, and all base stations that can implement the present application shall fall within the protection scope of the present application.

Figure 15:
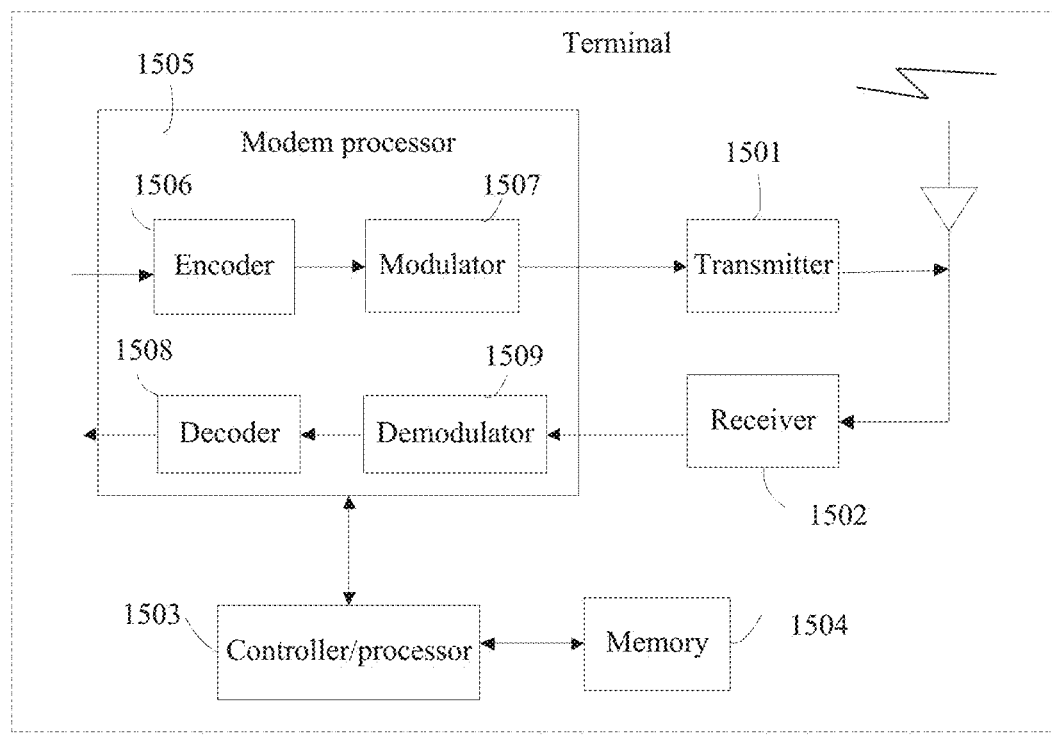
FIG. 15 is a schematic structural diagram of a terminal according to an embodiment of the present application.

FIG. 15 is a possible schematic structural diagram of the terminal provided in the foregoing embodiments. The terminal includes a transmitter 1501, a receiver 1502, a controller/processor 1503, a memory 1504, and a modem processor 1505.

The transmitter 1501 adjusts (for example, performs analog-conversion, filtering, amplification, and up-conversion) the output sampling and generates an uplink signal. The uplink signal is transmitted to the base station in the foregoing embodiments by using an antenna. On a downlink link, the antenna receives a downlink link signal sent by the base station in the foregoing embodiment. The receiver 1502 adjusts (for example, performs filtering, amplification, down-conversion, and digitization on) a signal received by using the antenna and provides input sampling. In the modem processor 1505, the encoder 1506 receives service data and a signaling message that are to be sent on an uplink, and processes (for example, performs formatting, encoding, and interleaving on) the service data and the signaling message. The modulator 1507 further processes (for example, performs symbol mapping and modulation on) the encoded service data and signaling message and provides output sampling. The demodulator 1509 processes (for example, performs demodulation on) the input sampling and provides symbol estimation. The decoder 1508 processes (for example, performs deinterleaving and decoding on) the symbol estimation and provides decoded data and a decoded signaling message to be sent to the terminal. The encoder 1506, the modulator 1507, the demodulator 1509, and the decoder 1508 may be implemented by the synthetic modem processor 1505. These units perform processing based on a radio access technology (for example, access technologies in an LTE system and other evolved systems) used in a radio access network.

The controller/processor 1503 controls and manages an action of the terminal, and is configured to: perform the processing performed by the terminal in the foregoing embodiments, and control the transmitter 1501 and the receiver 1502 to complete the actions performed by the terminal 1 or the terminal 2 in FIG. 6 to FIG. 13. The memory 1504 is configured to store program code and data used for the terminal.

Figure 16:
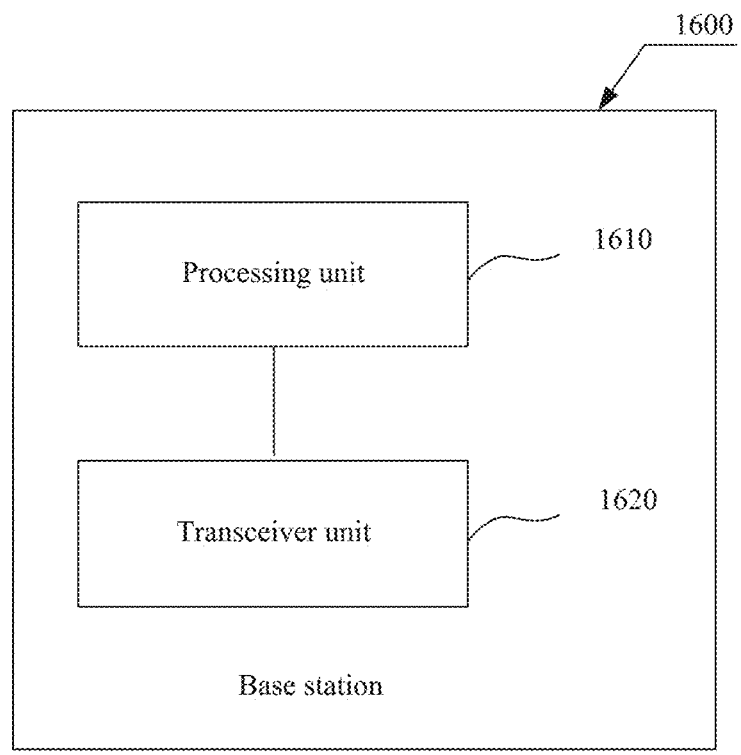
FIG. 16 is another schematic structural diagram of a base station according to an embodiment of the present application.

FIG. 16 shows a base station 1600 according to an embodiment of the present application. The base station 1600 may include a processing unit 1610 and a transceiver unit 1620. The processing unit 1610 can implement the function of the controller/processor 1402 of the base station in FIG. 14. The transceiver unit 1620 can implement the function of the transmitter/receiver 1401 of the base station in FIG. 14.

Figure 17:
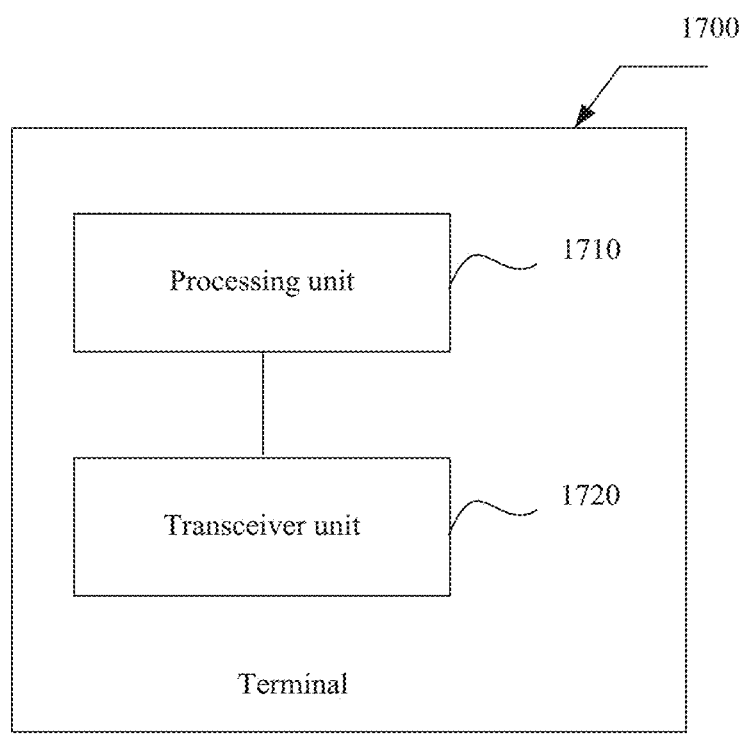
FIG. 17 is another schematic structural diagram of a terminal according to an embodiment of the present application.

FIG. 17 shows a terminal 1700 according to an embodiment of the present application. The terminal 1700 may include a processing unit 1710 and a transceiver unit 1720.

The processing unit 1710 can implement the function of the controller/processor 1503 of the terminal in FIG. 15. The transceiver unit 1720 can implement the functions of the transmitter 1501 and the receiver 1502 of the terminal in FIG. 15.

A person skilled in the art may further understand that various illustrative logical blocks and steps that are listed in the embodiments of the present application may be implemented by using electronic hardware, computer software, or a combination thereof. To clearly display the interchangeability between the hardware and the software, functions of the foregoing various illustrative components and steps have been generally described. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of the present application.

The various illustrative logical blocks, modules, and circuits described in the embodiments of the present application may implement or operate the described functions by using a general processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general processing unit may be a microprocessing unit. Optionally, the general processing unit may be any traditional processing unit, controller, microcontroller, or state machine. The processing unit may be implemented by a combination of computing apparatuses, such as a digital signal processing unit and a microprocessing unit, multiple microprocessing units, one or more microprocessing units with a digital signal processing unit core, or any other similar configuration.

Steps of the methods or algorithms described in the embodiments of the present application may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processing unit so that the processing unit may read information from the storage medium and write information to the storage medium. Alternatively, the storage medium may further be integrated into a processing unit. The processing unit and the storage medium may be arranged in an ASIC, and the ASIC may be arranged in a user terminal. Alternatively, the processing unit and the storage medium may be arranged in different components of the user terminal.

In one or more examples of designs, the functions described in the embodiments of the present application may be implemented by using hardware, software, firmware, or any combination thereof. If the present application is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc and the disk include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present application, technologies in the art may use or implement the content of the present application. Any modification based on the disclosed content shall be considered obvious in the art. The basic principles described in the present application may be applied to other variations without departing from the essence and scope of the present application. Therefore, the content disclosed in the present application is not limited to the described embodiments and designs but may also be extended to a maximum scope that is consistent with the principles and disclosed new features of the present application.

What is claimed is:

1. A signal communication method for time alignment between peer-to-peer entities, comprising:
    determining, by a first base station, a second timing for sending a first symbol to a terminal;
    determining, by the first base station, a first timing for sending the first symbol to a second base station, wherein the first timing is at least determined by the second timing for sending the first symbol from the first base station to the terminal and a time offset between the first and second base stations, wherein the time offset is greater than a length of a cyclic prefix of the first symbol and smaller than a length of the first symbol and determined by a distance between the first and second base stations and a multiplication of a fixed timing advance offset and a basic timing unit; and
    sending, by the first base station, the first symbol to the second base station by using the first timing, wherein the sending of the first symbol by the first base station and the receiving of the first symbol by the second base station is aligned according to the first timing.

2. The method according to claim 1, wherein:
    the time offset between the first and second base stations is determined by:
    a fixed timing advance offset $N_{TA\ offset}$; or
    the $N_{TA\ offset}$ and a distance between the first and second base stations.

3. The method according to claim 1, wherein the first timing is earlier than the second timing.

4. The method according to claim 3, wherein the first timing is earlier than the second timing by a time duration $N_{TA\ offset} \cdot T_s$, wherein $T_s$ is a basic time unit.

5. The method according to claim 1, wherein a second symbol before the first symbol is not used by the first base station for signal communication, and the second symbol and the first symbol are consecutive in a sequence of symbols sent by the first base station.

6. A signal communication method for time alignment between peer-to-peer entities, comprising:
    determining, by a first terminal, a fourth timing for sending a third symbol to a base station;
    determining, by the first terminal, a third timing for sending the third symbol to a second terminal, wherein the third timing is at least determined by the fourth timing for sending the third symbol from the first terminal to the base station and a time offset between the first and second terminals, wherein the time offset is greater than a length of a cyclic prefix of the third symbol and smaller than a length of the third symbol and determined by a distance between the first and second terminals and a multiplication of a fixed timing advance offset and a basic timing unit; and
    sending, by the first terminal, the third symbol to the second terminal by using the third timing, wherein the sending of the third symbol by the first terminal and the receiving of the third symbol by the second terminal is aligned according to the third timing.

7. The method according to claim 6, wherein the time offset between the first and second terminals is determined by:
    a fixed timing advance offset $N_{TA\ offset}$; or
    the $N_{TA\ offset}$ and a distance between the first and second terminals.

8. The method according to claim 6, wherein the third timing is later than the fourth timing.

9. The method according to claim 8, wherein the third timing is later than the fourth timing by a time duration $N_{TA\ offset} \cdot T_s$, wherein $T_s$ is a basic time unit.

10. The method according to claim 6, wherein a fourth symbol after the third symbol is not used by the first terminal for signal communication with the second terminal, and the third symbol and the fourth symbol are consecutive in a sequence of symbols to be sent by the first terminal to the second terminal.

11. A first base station, comprising:
    a processor; and
    a memory coupled to the processor and storing instructions which, when executed by the processor, cause the first base station to:
    determine a second timing for sending a first symbol to a terminal;
    determine a first timing for sending the first symbol to a second base station, wherein the first timing is at least determined by the second timing for sending the first symbol from the first base station to the terminal and a time offset between the first and second base stations, wherein the time offset is greater than a length of a cyclic prefix of the first symbol and smaller than a length of the first symbol and determined by a distance between the first and second base stations and a multiplication of a fixed timing advance offset and a basic timing unit; and
    send the first symbol to the second base station by using the first timing, wherein the sending of the first symbol by the first base station and the receiving of the first symbol by the second base station is aligned according to the first timing.

12. The first base station according to claim 11, wherein the time offset between the first and second base stations is determined by:
    a fixed timing advance offset $N_{TA\ offset}$; or the $N_{TA\ offset}$ and a distance between the first and second base stations.

13. The first base station according to claim 11, wherein the first timing is earlier than the second timing.

14. The first base station according to claim 13, wherein the first timing is earlier than the second timing by a time duration $N_{TA\ offset} \cdot T_s$, wherein $T_s$ is a basic time unit.

15. The first base station according to claim 11, wherein a second symbol before the first symbol is not used by the first base station for signal communication with the second base station, and the second symbol and the first symbol are consecutive in a sequence of symbols sent by the first base station to the second base station.

16. A first terminal, comprising:
a processor; and
a memory coupled to the processor and storing instructions which, when executed by the processor, cause the first terminal to:
determine a fourth timing for sending a third symbol to a base station;
determine a third timing for sending the third symbol to a second terminal, wherein the third timing is at least determined by the fourth timing for sending the third symbol from the first terminal to the base station and a time offset between the first and second terminals, wherein the time offset is greater than a length of a cyclic prefix of the third symbol and smaller than a length of the third symbol and determined by a distance between the first and second terminals and a multiplication of a fixed timing advance offset and a basic timing unit; and
send the third symbol to the second terminal by using the third timing, wherein the sending of the third symbol by the first terminal and the receiving of the third symbol by the second terminal is aligned according to the third timing.

17. The first terminal according to claim 16, wherein the time offset between the first and second terminals is determined by:
a fixed timing advance offset $N_{TA\ offset}$; or
the $N_{TA\ offset}$ and a distance between the first and second terminals.

18. The first terminal according to claim 16, wherein the third timing is later than the fourth timing.

19. The first terminal according to claim 18, wherein the third timing is later than the fourth timing by a time duration $N_{TA\ offset} \cdot T_s$, wherein $T_s$ is a basic time unit.

20. The first terminal according to claim 16, wherein a fourth symbol after the third symbol is not used by the first terminal for signal communication with the second terminal, and the third symbol and the fourth symbol are consecutive in a sequence of symbols to be sent by the first terminal to the second terminal.

* * * * *

UNITED STATES PATENT AND TRADEMARK OFFICE
CERTIFICATE OF CORRECTION

PATENT NO. : 11,044,722 B2  
APPLICATION NO. : 16/179141  
DATED : June 22, 2021  
INVENTOR(S) : Zhang Page 1 of 1

It is certified that error appears in the above-identified patent and that said Letters Patent is hereby corrected as shown below:

On the Title Page

Applicant item (71): "HUAWEI TECHNOLOGIES CO., LTD., Guangdong (CN)" should read -- HUAWEI TECHNOLOGIES CO., LTD., Shenzhen (CN) --.

Signed and Sealed this  
Nineteenth Day of July, 2022

Katherine Kelly Vidal  
*Director of the United States Patent and Trademark Office*